United States Patent
Yosida et al.

(10) Patent No.: US 6,566,001 B2
(45) Date of Patent: May 20, 2003

(54) SOLID POLYMER ELECTROLYTE FUEL CELL AND NON-HUMIDIFYING OPERATING METHOD THEREFOR

(75) Inventors: Takahiro Yosida, Utsunomiya (JP); Takashi Moriya, Utsunomiya (JP); Hideo Kato, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/745,665

(22) Filed: Dec. 21, 2000

(65) Prior Publication Data

US 2001/0005557 A1 Jun. 28, 2001

(30) Foreign Application Priority Data

Dec. 28, 1999 (JP) .............................. 11-374641

(51) Int. Cl.[7] ................................. H01M 8/10
(52) U.S. Cl. ............................. 429/30; 429/12; 429/13; 429/34
(58) Field of Search ............................. 429/13, 12, 30, 429/34

(56) References Cited

U.S. PATENT DOCUMENTS

| | | | |
|---|---|---|---|
| 5,523,181 A | * | 6/1996 | Stonehart et al. ............ 429/192 |
| 5,773,160 A | * | 6/1998 | Wilkinson et al. ............ 429/13 |
| 6,103,412 A | * | 8/2000 | Hirano et al. .................. 429/24 |

* cited by examiner

Primary Examiner—Patrick Ryan
Assistant Examiner—Angela J Martin
(74) Attorney, Agent, or Firm—Lahive & Cockfield, LLP (57) ABSTRACT

A fuel cell includes a solid polymer ion exchange membrane having a thickness which is set to be within a range of 20 μm to 60 μm. The fuel cell comprises a fuel gas flow passage for supplying a non-humidified fuel gas from a side of a first surface of the ion exchange membrane, and an oxygen-containing gas flow passage for supplying a non-humidified oxygen-containing gas from a side of a second surface of the ion exchange membrane. A portion of the fuel gas flow passage, which is disposed in the vicinity of a fuel gas inlet, is arranged closely to a portion of the oxygen-containing gas flow passage disposed in the vicinity of an oxygen-containing gas outlet. Accordingly, the oxygen-containing gas and the fuel gas can be supplied without humidification, and it is possible to perform efficient and smooth operation.

12 Claims, 11 Drawing Sheets

SOLID POLYMER ELECTROLYTE FUEL CELL AND NON-HUMIDIFYING OPERATING METHOD THEREFOR

BACKGROUND OF THE INVENTION

1. Field of the Invention

The present invention relates to a fuel cell and a method for operating the same, the fuel cell comprising a fuel cell unit composed of an electrolyte interposed between an anode electrode and a cathode electrode, and separators for supporting the fuel cell unit interposed therebetween.

2. Description of the Related Art

For example, the solid polymer type fuel cell comprises a fuel cell unit including an anode electrode and a cathode electrode disposed opposingly on both sides of an ion exchange membrane composed of a polymer ion exchange membrane (cation exchange membrane) respectively, the fuel cell unit being interposed between separators. Usually, the solid polymer type fuel cell is used as a fuel cell stack obtained by stacking a predetermined number of the fuel cell units.

In such a fuel cell stack, a fuel gas such as a gas principally containing hydrogen (hereinafter referred to as "hydrogen-containing gas" as well), which is supplied to the anode electrode, contains hydrogen which is ionized into ion on the catalyst electrode, and the ion is moved toward the cathode electrode via the electrolyte which is appropriately humidified. The-electron, which is generated during this process, is extracted for an external circuit, and the electron is utilized as DC electric energy. An oxygen-containing gas such as a gas principally containing oxygen or air (hereinafter referred to as "oxygen-containing gas" as well) is supplied to the cathode electrode. Therefore, the hydrogen ion, the electron, and the oxygen are reacted with each other on the cathode electrode, and thus water is produced.

In the fuel cell described above, a variety of humidifying structures are adopted in order to avoid the degradation of power generation performance which would be otherwise caused when the ion exchange membrane is dried. For example, a method is known, in which the hydrogen-containing gas or the oxygen-containing gas is supplied to the fuel cell after being humidified to approximately give a dew point at an operating temperature of the fuel cell. However, in the case of the method described above, for example, the hydrogen-containing gas or the oxygen-containing gas is subjected to bubbling in hot water at about 80° C. Therefore, it is necessary to provide additional equipment including a heater or the like. For this reason, the following inconvenience arises. That is, the entire equipment has a large size, and the equipment cost is expensive.

Considering such an inconvenience, in order to humidify the ion exchange membrane without using any additional humidifying apparatus, for example, a fuel cell is known, which is disclosed in U.S. Pat. No. 5,773,160. Water is produced by the reaction on the cathode electrode. The product water is increased in the flow direction of the oxygen-containing gas in the oxygen-containing gas flow passage for supplying the oxygen-containing gas to the cathode electrode. Therefore, the maximum water content region exists in the vicinity of the oxygen-containing gas outlet. On the other hand, the water content tends to decrease from the fuel gas inlet toward the fuel gas outlet in the ion exchange membrane on the side of the fuel gas flow passage for supplying the hydrogen-containing gas to the anode electrode. An inconvenience arises such that the ion exchange membrane is dried.

Accordingly, the fuel cell described above is constructed as follows. That is, the oxygen-containing gas flow passage, which is disposed in the vicinity of the oxygen-containing gas outlet, is arranged closely to the fuel gas flow passage which is disposed in the vicinity of the fuel gas inlet. Thus, the water, which is accumulated in the oxygen-containing gas flow passage, is subjected to back-diffusion toward the fuel gas flow passage in accordance with the concentration gradient of water to humidify the ion exchange membrane on the side of the fuel gas flow passage.

However, in the case of the conventional technique described above, the thickness of the ion exchange membrane is often set to be about 100 $\mu$m. When such a large thickness is used, it is impossible for the water to appropriately cause the back-diffusion from the side of the oxygen-containing gas flow passage to the side of the fuel gas flow passage. For this reason, the following problem is pointed out. That is, the humidity retention is not achieved sufficiently for the ion exchange membrane on the side of the anode electrode, and it is impossible to maintain the stable power generation performance.

Further, no water is produced in the oxygen-containing gas flow passage upon the start of operation of the fuel cell. Therefore, a problem arises such that the ion exchange membrane is in a dried state, and the power generation performance is unstable.

SUMMARY OF THE INVENTION

A general object of the present invention is to provide a fuel cell which makes it possible to reliably supply, toward the side of a fuel gas flow passage, the water produced in an oxygen-containing gas flow passage and which makes it possible to perform non-humidifying operation with a simple structure.

A principal object of the present invention is to provide a method for operating a fuel cell, which makes it possible to perform the non-humidifying operation and which makes it possible to effectively shorten the start-up time.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
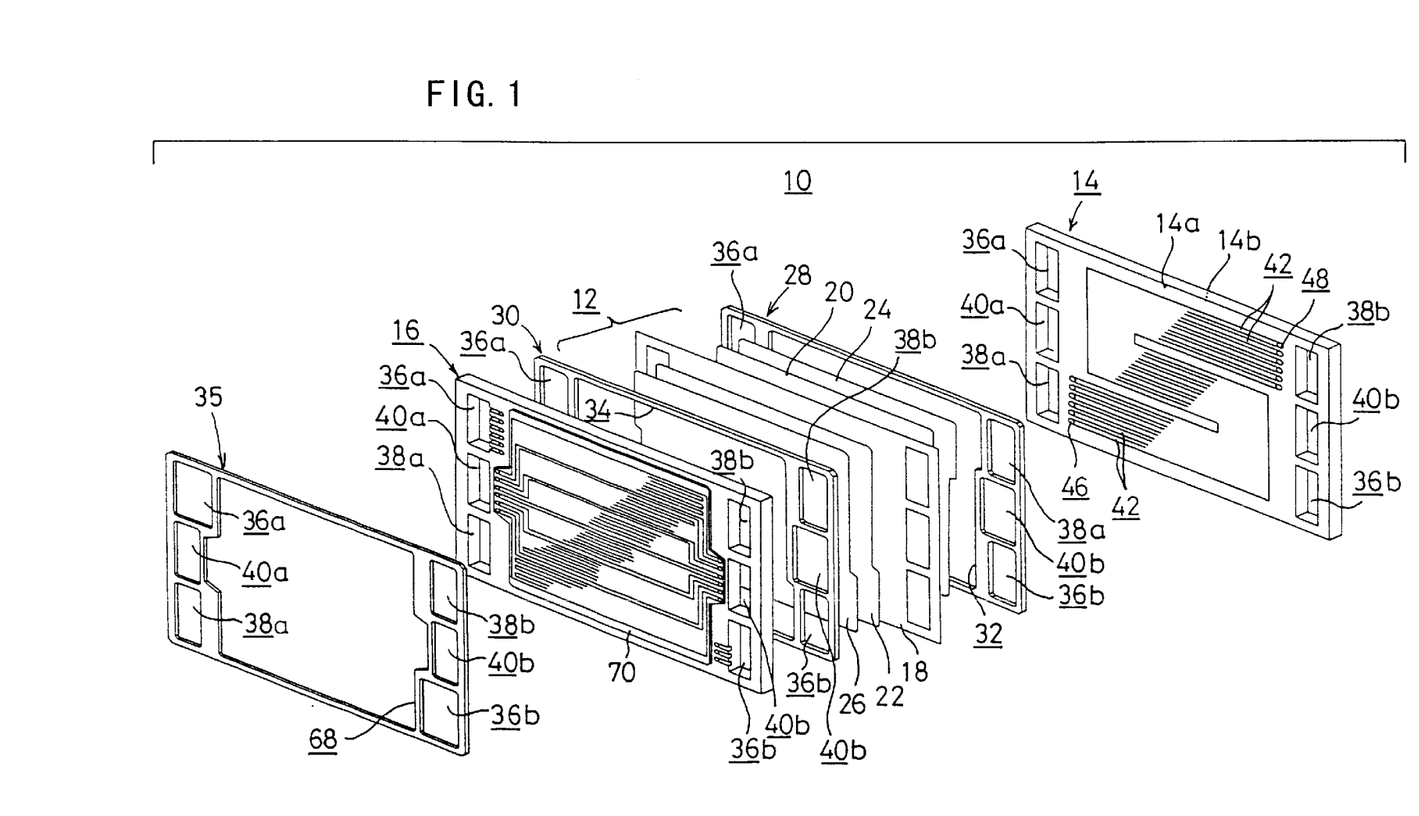
FIG. 1 shows an exploded perspective view illustrating principal parts of a fuel cell stack according to a first embodiment of the present invention.
Figure 2:
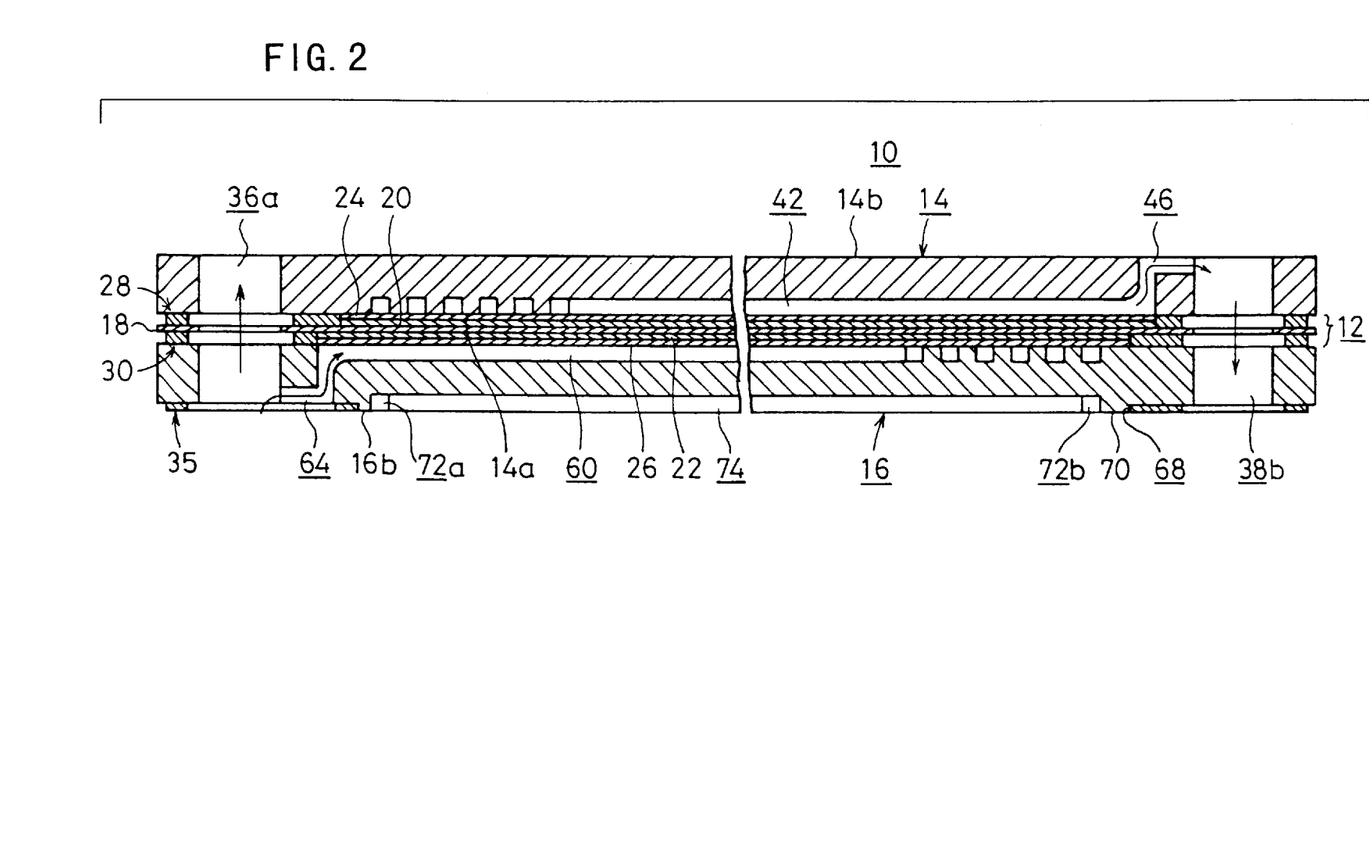
FIG. 2 shows a vertical sectional view illustrating principal parts of the fuel cell stack.

FIG. 1 shows an exploded perspective view illustrating principal parts of a fuel cell stack 10 according to a first embodiment of the present invention, and FIG. 2 shows a vertical sectional view illustrating principal parts of the fuel cell stack 10.

The fuel cell stack 10 comprises a fuel cell unit 12, and first and second separators 14, 16 for supporting the fuel cell unit 12 interposed therebetween. A plurality of sets of these components are stacked with each other. The fuel cell unit 12 includes a solid polymer ion exchange membrane 18, and a cathode electrode 20 and an anode electrode 22 which are arranged with the ion exchange membrane 18 intervening therebetween. First and second gas diffusion layers 24, 26, each of which is composed of, for example, porous carbon paper as a porous layer, are arranged for the cathode electrode 20 and the anode electrode 22. The ion exchange membrane 18 has a thickness which is set to be within a range of 20 $\mu$m to 60 $\mu$m.

First and second gaskets 28, 30 are provided on both sides of the fuel cell unit 12. The first gasket 28 has a large opening 32 for accommodating the cathode electrode 20 and the first gas diffusion layer 24. On the other hand, the second gasket 30 has a large opening 34 for accommodating the anode electrode 22 and the second gas diffusion layer 26. The fuel cell unit 12 and the first and second gaskets 28, 30 are interposed between the first and second separators 14, 16. A third gasket 35 is arranged for the second separator 16.

The first separator 14 is provided, at its upper portions at the both ends in the lateral direction, with a fuel gas inlet 36a for allowing a fuel gas such as a hydrogen-containing gas to pass therethrough, and an oxygen-containing gas outlet 38b for allowing an oxygen-containing gas as a gas containing oxygen to pass therethrough. The first separator 14 is provided, at its central portions at the both ends in the lateral direction, with a cooling medium inlet 40a for allowing a cooling medium such as pure water, ethylene glycol, and oil to pass therethrough, and a cooling medium outlet 40b for allowing the cooling medium after being used to pass therethrough. The first separator 14 is provided, at its lower portions at the both ends in the lateral direction, with a fuel gas outlet 36b for allowing the fuel gas to pass therethrough, and an oxygen-containing gas inlet 38a for allowing the oxygen-containing gas to pass therethrough. The fuel gas outlet 36b and the oxygen-containing gas inlet 38a are disposed at diagonal positions with respect to the fuel gas inlet 36a and the oxygen-containing gas outlet 38b respectively.

A plurality of, for example, six of mutually independent oxygen-containing gas flow passages 42, are provided closely to the oxygen-containing gas inlet 38a such that they are directed in the vertically upward direction while meandering in the horizontal direction on the surface 14a opposed to the cathode electrode 20 of the first separator 14.

Figure 3:
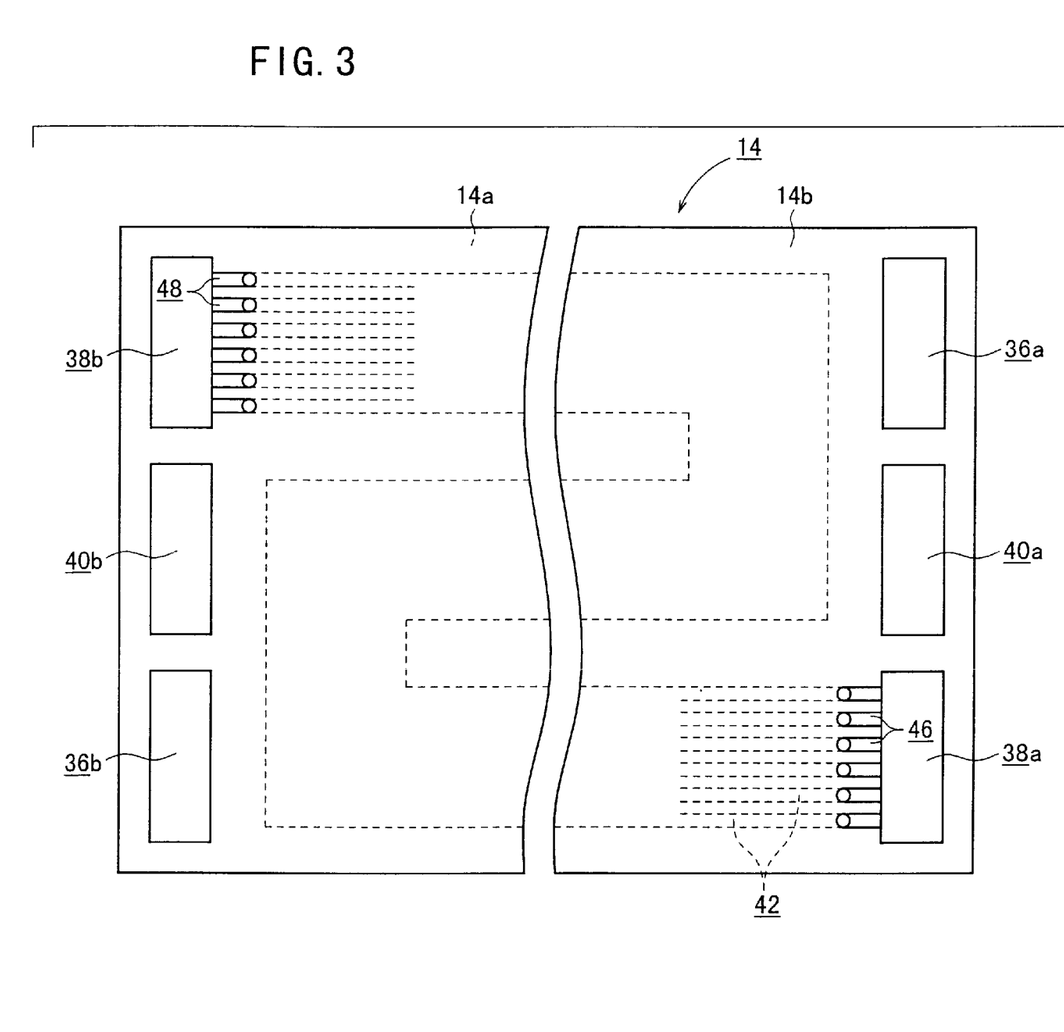
FIG. 3 shows a front view illustrating a first separator for constructing the fuel cell stack.

As shown in FIGS. 1 to 3, the first separator 14 is provided with first oxygen-containing gas connecting flow passages 46 which penetrate through the first separator 14, which communicate at first ends with the oxygen-containing gas inlet 38a on the surface 14b on the side opposite to the surface 14a, and which communicate at second ends with the oxygen-containing gas flow passages 42 on the side of the surface 14a, and oxygen-containing gas connecting flow passages 48 which communicate at first ends with the oxygen-containing gas outlet 38b on the side of the surface 14b and which communicate at second ends with the oxygen-containing gas flow passages 42 on the side of the surface 14a to penetrate through the first separator 14.

As shown in FIG. 1, the second separator 16 is provided, at portions at the both ends in the lateral direction, with a fuel gas inlet 36a, an oxygen-containing gas outlet 38b, a cooling medium inlet 40a, a cooling medium outlet 40b, a fuel gas outlet 36b, and an oxygen-containing gas inlet 38a, in the same manner as the first separator 14.

Figure 4:
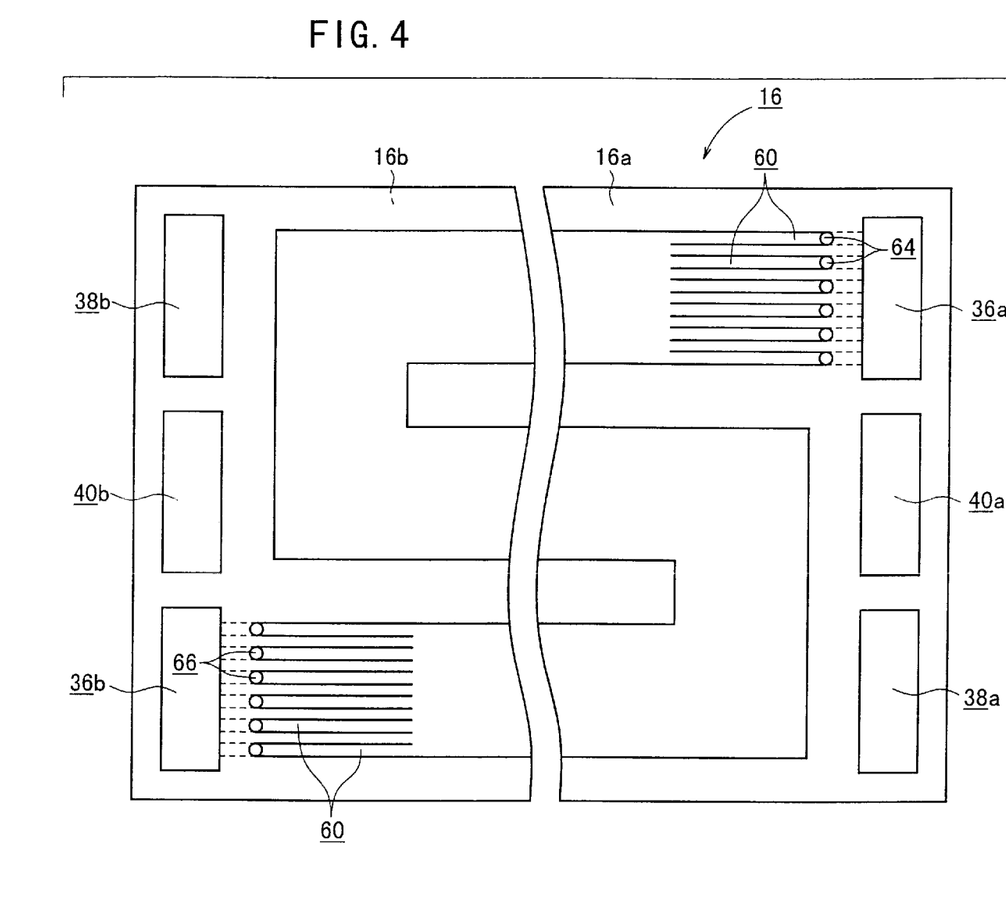
FIG. 4 shows a front view illustrating a first surface of a second separator for constructing the fuel cell stack.

As shown in FIG. 4, a plurality of, for example, six fuel gas flow passages 60 are formed closely to the fuel gas inlet 36a on the surface 16a of the second separator 16. The fuel gas flow passages 60 extend in the direction of the gravity (vertically downward direction) while meandering in the horizontal direction, and they terminate at positions close to the fuel gas outlet 36b.

The second separator 16 is provided with first fuel gas connecting flow passages 64 which make communication between the fuel gas inlet 36a and the fuel gas flow passages 60 from the side of the surface 16b, and second fuel gas connecting flow passages 66 which make communication between the fuel gas outlet 36b and the fuel gas flow passages 60 from the side of the surface 16b to penetrate through the second separator 16.

Figure 5:
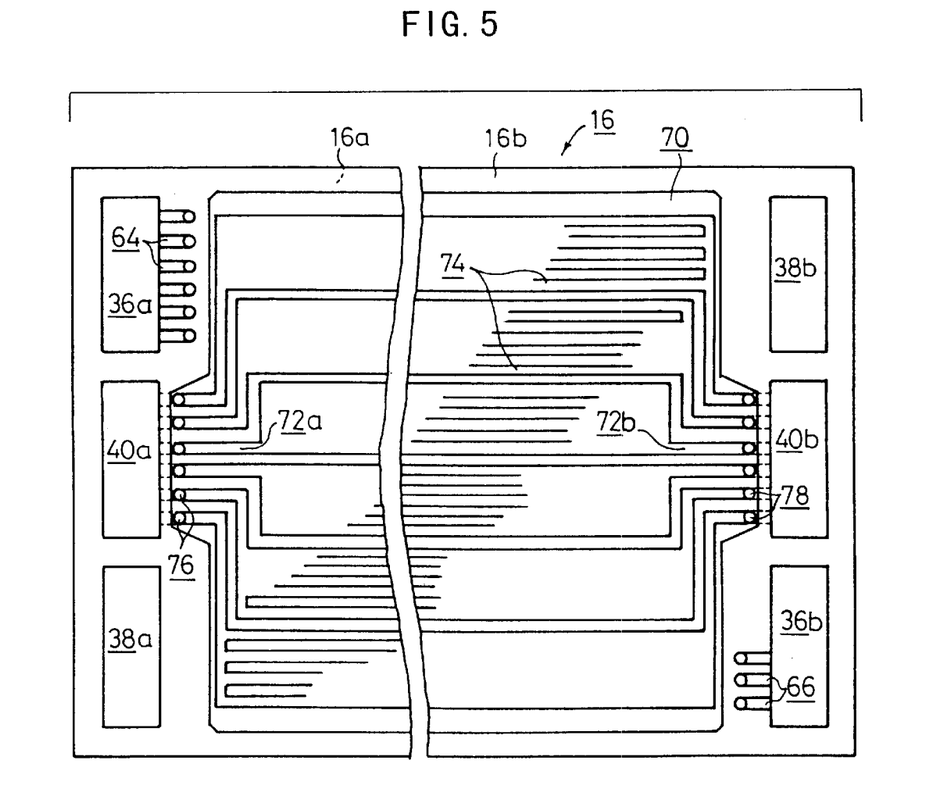
FIG. 5 shows a front view illustrating a second surface of the second separator.

As shown in FIGS. 2 and 5, a step section 70, which corresponds to an opening 68 of the third gasket 35, is formed on the surface 16b of the second separator 16. A plurality of main flow passage grooves 72a, 72b for constructing the cooling medium flow passage are formed closely to the cooling medium inlet 40a and the cooling medium outlet 40b in the step section 70. Branched flow passage grooves 74, which are branched into a plurality of individuals respectively, are provided to extend in the horizontal direction between the main flow passage grooves 72a, 72b.

The second separator 16 is provided with first cooling medium connecting flow passages 76 which make communication between the cooling medium inlet 40a and the main flow passage grooves 72a, and second cooling medium connecting flow passages 78 which make communication between the cooling medium outlet 40b and the main flow passage grooves 72b such that the first cooling medium connecting flow passages 76 and the second cooling medium connecting flow passages 78 penetrate through the second separator 16.

As shown in FIG. 1, each of the first, second, and third gaskets 28, 30, 35 is provided, at both end portions in the lateral direction, with a fuel gas inlet 36a, an oxygen-containing gas outlet 38b, a cooling medium inlet 40a, a cooling medium outlet 40b, a fuel gas outlet 36b, and an oxygen-containing gas inlet 38a.

Figure 6:
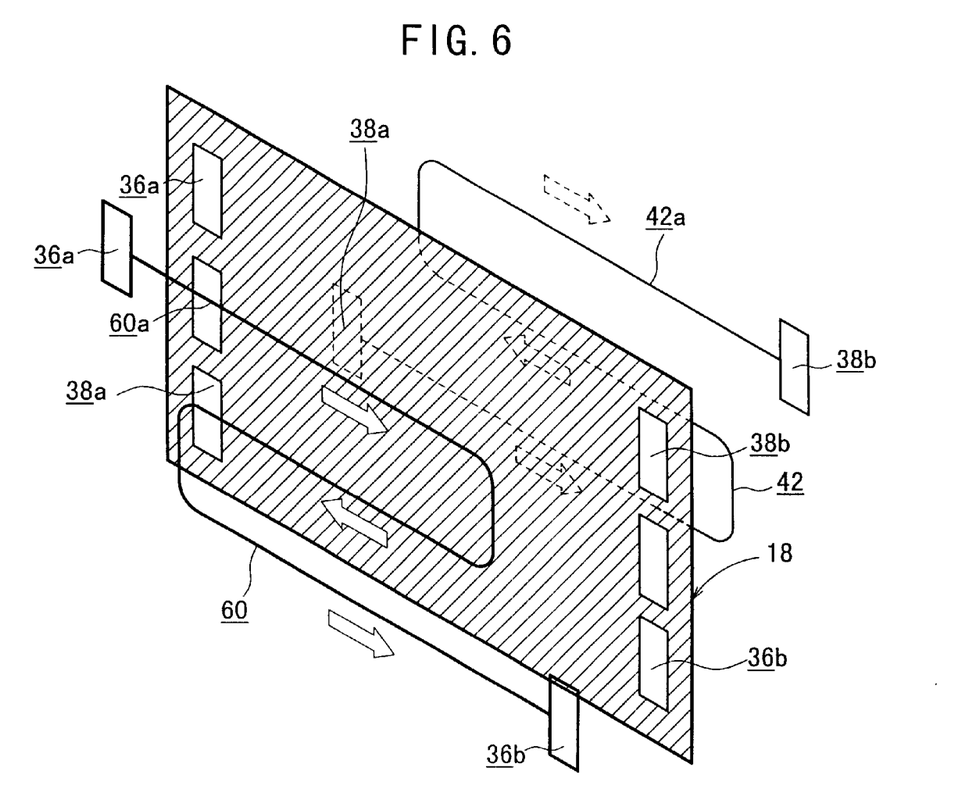
FIG. 6 shows a perspective view illustrating an oxygen-containing gas flow passage and a fuel gas flow passage formed in the first and second separators.

As shown in FIG. 6, the fuel gas flow passage 60 extends in the direction of the gravity (vertically downward direction) while meandering in the horizontal direction. On the other hand, the oxygen-containing gas flow passage 42 extends in the vertically upward direction while meandering in the horizontal direction. A portion 60a of the fuel gas flow passage 60, which is disposed in the vicinity of the fuel gas inlet 36a, is arranged closely to a portion 42a of the oxygen-containing gas flow passage 42 which is disposed in the vicinity of the oxygen-containing gas outlet 38b.

Figure 7:
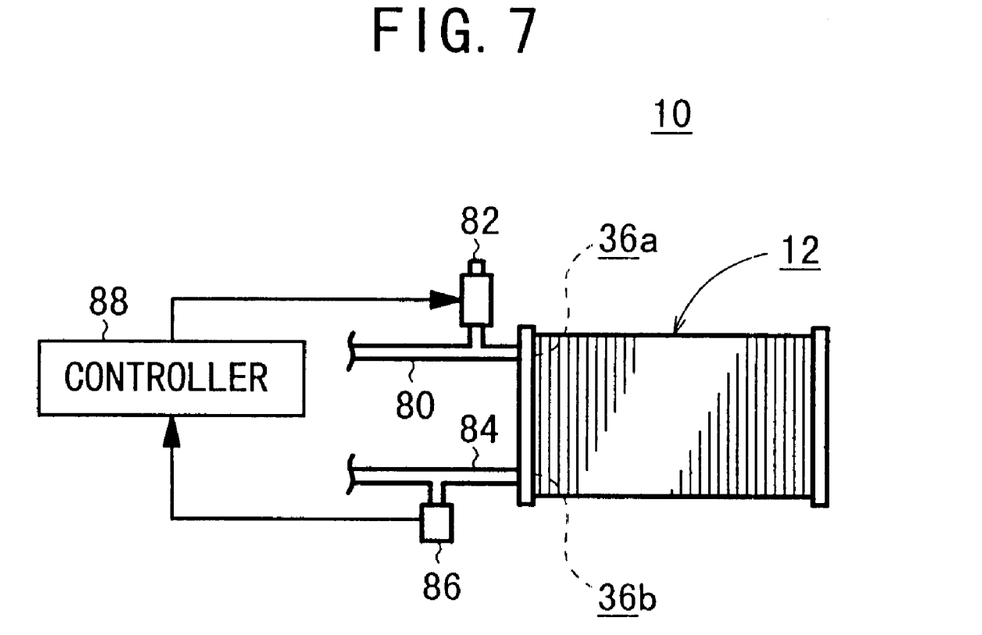
FIG. 7 shows a schematic arrangement illustrating the fuel cell stack and a humidifying means.

As shown in FIG. 7, the fuel gas inlet 36a is connected to an unillustrated fuel gas supply unit via a tube 80. A gas-humidifying means, for example, an injector 82 for humidifying the fuel gas for a predetermined period of time is arranged for the tube 80. A discharge tube passage 84 is connected to the fuel gas outlet 36b (or the oxygen-containing gas outlet 38b). A detector 86 for detecting the amount of water contained in the fuel gas (or the oxygen-containing gas) discharged from the fuel cell stack 10 is connected to the discharge tube passage 84. The amount of water detected by the detector 86 is sent to a controller 88. The controller 88 drives and controls the injector 82. The controller 88 has a function to control the operation of the entire fuel cell stack 10.

The operation of the fuel cell stack 10 according to the first embodiment constructed as described above will be explained below in relation to an operating method according to the present invention.

The fuel gas, for example, the gas containing hydrogen obtained by reforming hydrocarbon, or pure hydrogen or the like obtained from a hydrogen tank or hydrogen-absorbing alloy is supplied to the inside of the fuel cell stack 10, and the gas containing oxygen as the oxygen-containing gas (hereinafter simply referred to as "air") is supplied thereto. Further, the cooling medium is supplied in order to cool the power-generating surface of the fuel cell unit 12.

In this case, before the operation of the fuel cell stack 10 is firstly started, the fuel gas or the oxygen-containing gas is humidified for a predetermined period of time. When the fuel gas is humidified, for example, if the cell temperature of the fuel cell stack 10 is set to be 75° C. and the electrode area is set to be 510 cm$^2$, then the humidification is performed for the fuel gas for 30 minutes at a dew point of 70° C. with a steam amount of about 0.3 NLM (Normal Liter Per Minute). The term "Normal" indicates a condition at 25° C. at 1 atm. Specifically, as shown in FIG. 7, the fuel gas is humidified with the injector 82 arranged for the tube 80. Alternatively, it is also preferable to use, for example, a bubbling system or an ultrasonic humidifier.

On the other hand, the oxygen-containing gas is humidified as follows. That is, the oxygen-containing gas is humidified for 10 minutes at a dew point of 70° C. with a steam amount of about 1.0 NLM. When the air is used as the oxygen-containing gas, the supply amount is increased as compared with the fuel gas. The initial humidification can be completed in a short period of time when the oxygen-containing gas is humidified.

The initial humidification amount may be in such a degree as to make the ion exchange member 18 contain an appropriate amount of water. For example, it is necessary to allow the steam to flow in a degree of 0.01 NL/cm$^2$ to 0.1 NL/cm$^2$ per unit electrode area. If the amount of steam is not more than 0.01 NL/cm$^2$, then it is impossible to sufficiently allow the ion exchange membrane 18 to contain water, and the ohmic overpotential is increased. On the other hand, if the amount of steam is not less than 0.1 NL/cm$^2$, then the so-called flooding phenomenon, in which the surfaces of the cathode electrode 20 and the anode electrode 22 are coated with water, occurs, and the phenomenon, in which the reaction gas supply passage is closed by water droplets, occurs. As a result, the power generation characteristics are deteriorated.

As shown in FIG. 7, the judgement to decide whether or not the ion exchange membrane 18 appropriately contains water is performed by detecting the amount of water in the discharged gas by using the detector 86 which is arranged for the discharge tube passage 84. The controller 88 specifically judges whether or not the initial humidification is completed on the basis of a signal from the detector 86. If the initial humidification is completed, the supply of water from the injector 82 is stopped. That is, the water, which is firstly supplied, is absorbed by the ion exchange membrane 18. Therefore, when the water of not less than a predetermined amount is discharged from the discharge tube passage 84, it is judged that the initial humidification is completed.

It is desirable that the amount of water in the fuel gas or the oxygen-containing gas is large. However, it is preferable that the dew point is set to be slightly lower than the cell temperature in order to avoid the occurrence of condensation of water in the tube 80 and the communication hole in the fuel cell stack 10, because of the following reason. That is, the water droplets, which are formed by the condensation of water, are moved into the power-generating surface to consequently deteriorate the power generation characteristics. Therefore, it is necessary to reliably avoid the condensation of water.

After the initial humidification is completed as described above, the fuel gas and the oxygen-containing gas, which are not humidified, are supplied to the fuel gas inlet 36a and the oxygen-containing gas inlet 38a of the fuel cell stack 10 respectively. During this process, the pressure of the oxygen-containing gas supplied to the oxygen-containing gas inlet 38a is set to be higher by about 20 KPa to 50 KPa than the pressure of the fuel gas supplied to the fuel gas inlet 36a.

The fuel gas, which is supplied to the fuel gas inlet 36a, is moved from the side of the surface 16b to the side of the surface 16a via the first fuel gas connecting flow passages 64. The fuel gas is supplied to the fuel gas flow passage 60 formed on the side of the surface 16a. The fuel gas, which is supplied to the fuel gas flow passage 60, is moved in the direction of the gravity (vertically downward direction) while meandering in the horizontal direction along the surface 16a of the second separator 16. During this process, the hydrogen gas in the fuel gas passes through the second gas diffusion layer 26, and it is supplied to the anode electrode 22 of the fuel cell unit 12. The fuel gas, which is not used, is supplied to the anode electrode 22 while being moved along the fuel gas flow passage 60. On the other hand, the fuel gas, which is not used, is introduced into the second fuel gas connecting flow passages 66. The fuel gas is moved toward the side of the surface 16b, and then it is discharged to the fuel gas outlet 36b.

As shown in FIG. 1, the air, which is supplied to the oxygen-containing gas inlet 38a, is introduced into the oxygen-containing gas flow passage 42 via the first oxygen-containing gas connecting flow passages 46 which communicate with the oxygen-containing gas inlet 38a of the first separator 14. The air, which is supplied to the oxygen-containing gas flow passage 42, is moved in the direction of the antigravity (vertically upward direction) while meandering in the horizontal direction. The oxygen-containing gas in the air is supplied from the first gas diffusion layer 24 to the cathode electrode 20. On the other hand, the air, which is not used, is discharged from the second oxygen-containing gas connecting flow passages 48 to the oxygen-containing gas outlet 38b. Accordingly, the electric power is generated in the fuel cell unit 12. For example, the electric power is supplied to an unillustrated motor.

Further, the cooling medium, which is supplied to the inside of the fuel cell stack 10, is introduced into the cooling medium inlet 40a, and then it is supplied to the main flow passage grooves 72a on the side of the surface 16b via the first cooling medium connecting flow passages 76 of the second separator 16 as shown in FIG. 5. The cooling medium passes through the plurality of branched flow passage grooves 74 which are branched from the main flow passage grooves 72a to cool the power-generating surface of the fuel cell unit 12, followed by being merged into the main flow passage grooves 72b. The cooling medium after the use passes through the second cooling medium connecting flow passages 78, and it is discharged from the cooling medium outlet 40b.

In the first embodiment, as schematically shown in FIG. 6, the fuel gas is moved in the vertically downward direction while meandering in the horizontal direction along the side of the first surface of the ion exchange membrane 18. On the other hand, the oxygen-containing gas is moved in the vertically upward direction while meandering in the horizontal direction along the side of the second surface of the ion exchange membrane 18. Water is produced in the oxygen-containing gas flow passage 42 in which the oxygen-containing gas is moved. The maximum water content region is brought about at the portion 42 of the oxygen-containing gas flow passage 42 which is disposed in the vicinity of the oxygen-containing gas outlet 38b. On the other hand, the portion 60a of the fuel gas flow passage 60, which is disposed in the vicinity of the fuel gas inlet 36a, is arranged closely to the maximum water content region of the oxygen-containing gas flow passage 42.

Accordingly, the back-diffusion is caused in the ion exchange membrane 18 in accordance with the water concentration gradient which is generated between the portion 42a of the oxygen-containing gas flow passage 42 disposed in the vicinity of the oxygen-containing gas outlet 38b and the portion 60a of the fuel gas flow passage 60 disposed in the vicinity of the fuel gas inlet 36a. Thus, the water is supplied from the oxygen-containing gas flow passage 42 to the fuel gas flow passage 60 to humidify the ion exchange membrane 18 on the side of the anode electrode 22. Accordingly, the product water is sufficiently diffused to the part of the fuel gas flow passage 60 in the vicinity of the fuel gas inlet 36a. The ion exchange membrane 18 can be humidified smoothly and reliably on the side of the anode electrode 22 by the aid of the fuel gas flowing along the fuel gas flow passage 60. Thus, the non-humidifying operation of the fuel cell stack 10 is efficiently performed.

The thickness of the ion exchange membrane 18 is set to be within the range of 20 $\mu$m to 60 $\mu$m. The back-diffusion of the product water is smoothly accomplished from the oxygen-containing gas flow passage 42 toward the fuel gas flow passage 60. Thus, it is possible to reliably humidify the ion exchange membrane 18. Especially, the following advantage is obtained. That is, even when the load on the fuel cell stack 10 is quickly increased, and the water concentration in the ion exchange membrane 18 is lowered, then the water can be reliably supplied toward the fuel gas flow passage 60 to maintain the power generation performance of the fuel cell stack 10. If the thickness of the ion exchange membrane 18 is less than 20 $\mu$m, the gas leak is conspicuous. On the other hand, if the thickness exceeds 60 $\mu$m, it is feared that the back-diffusion of the water is not accomplished smoothly.

The first and second gas diffusion layers 24, 26, each of which is composed of, for example, porous carbon paper, are arranged for the cathode electrode 20 and the anode electrode 22. The hydrophilic property of each of the first and second gas diffusion layers 24, 26 is maintained in a well-suited manner. Therefore, the following effect is especially obtained. That is, it is possible to effectively keep the water subjected to the back-diffusion to the anode electrode 22.

The oxygen-containing gas flow passage 42 and the fuel gas flow passage 60 are designed to have the meandering configuration (serpentine) provided in the vertical direction while meandering in the horizontal direction. Accordingly, the gas flow passage length can be effectively lengthened to increase the contact area for allowing the product water to flow from the oxygen-containing gas flow passage 42 to the fuel gas flow passage 60. It is possible to allow the product water to effectively flow toward the fuel gas flow passage 60.

In this process, the oxygen-containing gas flow passage 42 allows the oxygen-containing gas to flow from the vertically downward position to the upward position. Accordingly, the product water on the side of the oxygen-containing gas outlet 38a easily flows from the upward position to the downward position owing to its self-weight. Therefore, the product water flows into the side of the oxygen-containing gas inlet 38a in which the amount of product water is relatively small. It is possible to effectively supply the product water from the oxygen-containing gas flow passage 42 to the fuel gas flow passage 60 over the entire surface of the power-generating surface of the ion exchange membrane 18. It is possible to maintain the high power generation performance.

In the first embodiment, as shown in FIG. 7, the water is supplied to the fuel gas (or the oxygen-containing gas) by using, for example, the injector 82 before starting the initial operation of the fuel cell stack 10. The humidified fuel gas (or the oxygen-containing gas) is supplied to the fuel cell stack 10 for the predetermined period of time. Therefore, the following effect is obtained. That is, it is possible to quickly retain the desired humidified state of the ion exchange membrane 18, and the operation of the fuel cell stack 10 is effectively started in a short period of time.

Further, it is sufficient to perform the humidification of the gas only before the operation. The structure of the injector 82 or the like as the humidifying means is compact and simple, which is economic. It is possible to shorten the start-up time for the fuel cell stack 10 by detecting, by the detector 86, whether or not the initial humidification is completed. It is possible to effectively start the operation of the fuel cell stack 10.

The non-humidifying operation was performed by using the first embodiment to allow the oxygen-containing gas and the fuel gas to flow in the mutually different directions with the oxygen-containing gas flow passage 42 and the fuel gas flow passage 60 (hereinafter referred to as "counterflow") and a conventional structure to allow the oxygen-containing gas and the fuel gas to flow in the identical direction (hereinafter referred to as "parallel flow"). The following operating condition was adopted. That is, the cell temperature was 70° C., the pressure of the oxygen-containing gas was 100 KPa, the pressure of the fuel gas was 50 KPa, the utilization factor of the fuel gas was 70%, the utilization factor of the oxygen-containing gas was 50%, and the dew points of the oxygen-containing gas and the fuel gas were set to be dry. For the purpose of comparison, an experiment was performed, in which the operation was performed by always humidifying the fuel gas or the oxygen-containing gas (counterflow continuous operation) with the same structure as that of the first embodiment.

Figure 8:
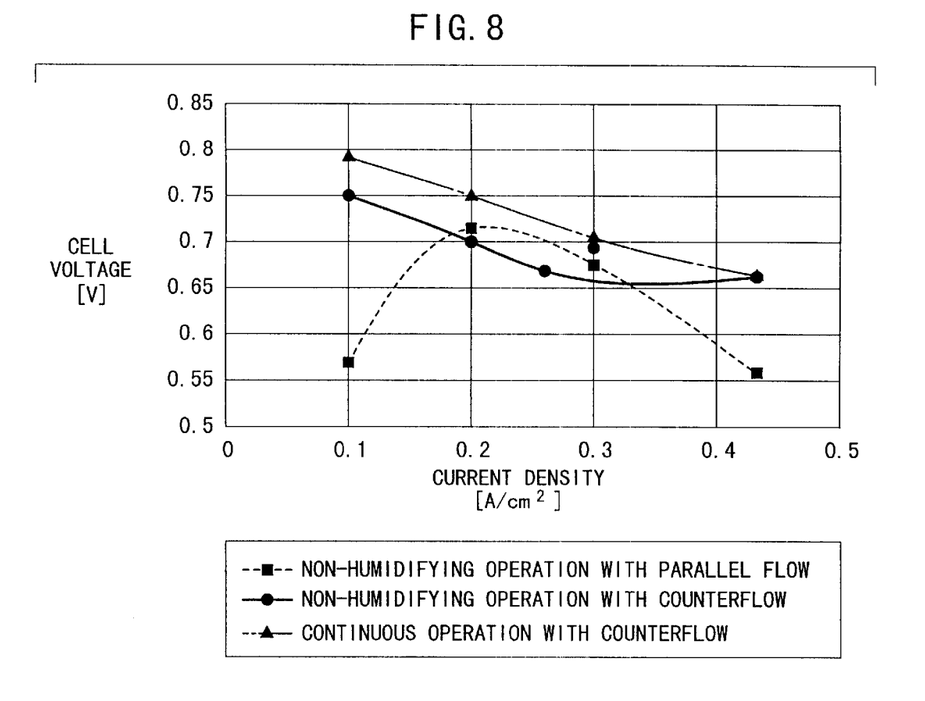
FIG. 8 illustrates a relationship between the current density and the cell voltage in the humidifying operation and in the non-humidifying operation.

As a result, as shown in FIG. 8, the following result was obtained for the conventional parallel flow. That is, when the current density was 0.1 A/cm$^2$ which was low, and when the current density was 0.4 A/cm$^2$ which was large, then the cell voltage was greatly lowered, and the power generation performance was remarkably deteriorated. On the other hand, the following result was obtained for the non-humidifying operation with the counterflow in accordance with the first embodiment. That is, there was little difference in performance as compared with the continuous operation with the counterflow over the entire region of the applied load, and it is possible to obtain the desired power generation performance.

Figure 9:
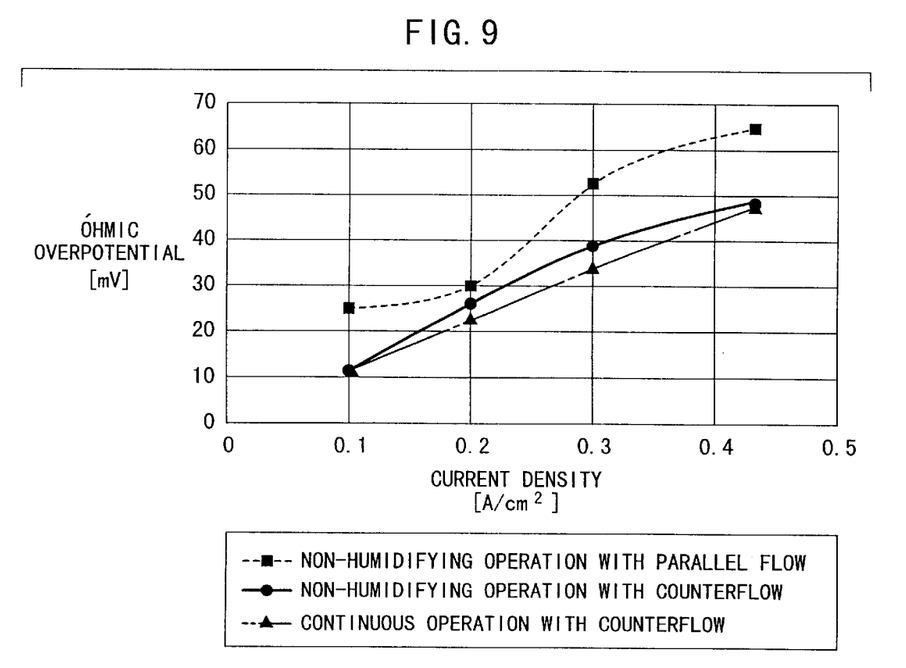
FIG. 9 illustrates a relationship between the current density and the ohmic overpotential in the humidifying operation and in the non-humidifying operation.

FIG. 9 shows the relationship between the current density and the ohmic overpotential. The ohmic overpotential was large in the case of the conventional parallel flow, and the operation voltage (cell voltage) of the fuel cell stack 10 was greatly lowered. On the contrary, the following effect was obtained for the non-humidifying operation with the counterflow according to the first embodiment. That is, the ohmic overpotential was obtained in the same manner as in the continuous operation with the counterflow, and the decrease of the cell voltage was not caused.

Especially, in order to produce a large amount of product water, it is desirable that the current density is high. For example, it is preferable that the current density is about 0.3 A/cm$^2$. In such a situation, the ohmic overpotential is considerably increased in the case of the conventional parallel flow. On the contrary, the first embodiment provides the following effect. That is, the ohmic overpotential is given in the same manner as in the continuous operation with the counterflow, and it is possible to maintain the desired power generation performance.

Subsequently, an experiment was performed for the dependency on the cell temperature, the gas pressure, and the gas utilization factor in the non-humidifying operation. As a result, when the cell temperature was raised, the ion exchange membrane 18 was apt to be dried. Experimentally, a temperature of about 70° C. was effective. As for the gas pressure, when the pressure of the oxygen-containing gas was set to be higher than the pressure of the fuel gas, then the back-diffusion of water was effectively performed, and the ion exchange membrane 18 was successfully humidified. As for the oxygen-containing gas, the appropriate non-humidifying operation was achieved, when the utilization factor was not more than 50%. On the other hand, when the utilization factor of the fuel gas was 50% to 70%, the appropriate non-humidifying operation was performed.

Figure 10:
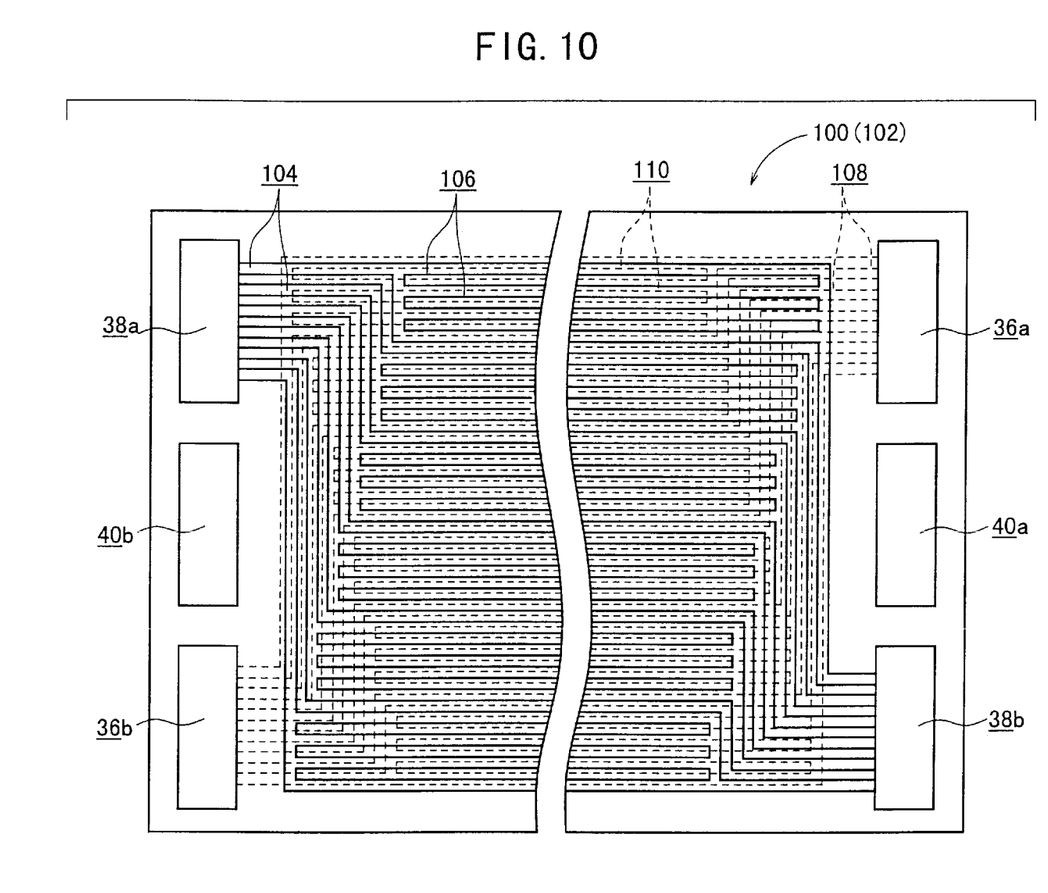
FIG. 10 shows a schematic arrangement illustrating a first separator and a second separator for constructing a fuel cell stack according to a second embodiment of the present invention.

FIG. 10 shows a schematic arrangement illustrating first and second separators 100, 102 for constructing a fuel cell stack according to a second embodiment of the present invention. The same constitutive components as those of the first embodiment are designated by the same reference numerals, detailed explanation of which will be omitted.

In the second embodiment, oxygen-containing gas inlets 38a are provided at upper portions on first end sides of the first and second separators 100, 102, and oxygen-containing gas outlets 38b are provided at lower portions on second end sides. The first separator 100 is formed with a plurality of first oxygen-containing gas flow passages 104 which communicate with the oxygen-containing gas inlet 38a and the oxygen-containing gas outlet 38b. Each of the first oxygen-containing gas flow passages 104 is branched into four second oxygen-containing gas flow passages 106. The second oxygen-containing gas flow passages 106 extend to equivalently cover the power-generating surface, and then they communicate with the oxygen-containing gas outlet 38b via the first oxygen-containing gas flow passages 104 disposed on the lower side.

The second separator 102 is formed with a plurality of first fuel gas flow passages 108 which communicate with the fuel gas inlet 36a and the fuel gas outlet 36b. Each of the first fuel gas flow passages 108 is branched into four second fuel gas flow passages 110. The second fuel gas flow passages 110 extend equivalently over the entire surface of the power-generating surface.

In the second embodiment constructed as described above, the second fuel gas flow passage 110, which is disposed in the vicinity of the fuel gas inlet 36a, is arranged closely to the second oxygen-containing gas flow passage 106 which is disposed in the vicinity of the oxygen-containing gas outlet 38b. Accordingly, the water is reliably subjected to back-diffusion from the second oxygen-containing gas flow passage 106 disposed in the vicinity of the oxygen-containing gas outlet 38b at which a large amount of water is produced, to the second fuel gas flow passage 110 disposed in the vicinity of the fuel gas inlet 36a. The same effect as that obtained in the first embodiment is obtained. That is, for example, the ion exchange membrane 18 is reliably humidified.

Figure 11:
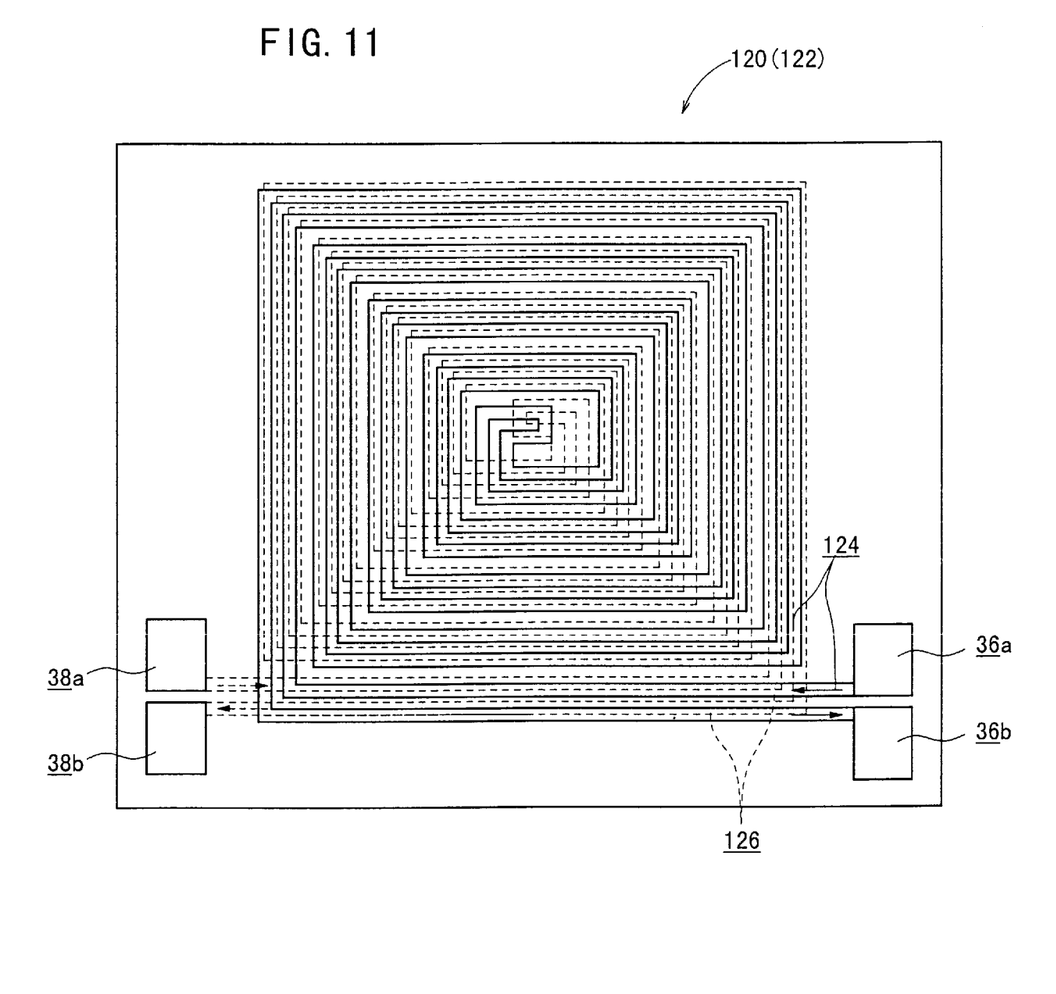
FIG. 11 shows a schematic arrangement illustrating a first separator and a second separator for constructing a fuel cell stack according to a third embodiment of the present invention.

FIG. 11 shows a schematic arrangement illustrating first and second separators 120, 122 for constructing a fuel cell stack according to a third embodiment of the present invention.

The first separator 120 is provided with an oxygen-containing gas flow passage 124 which communicates with an oxygen-containing gas inlet 38a. The oxygen-containing gas flow passage 124 is formed in a spiral configuration in the surface of the first separator 120, while it is turned at the central portion, and it communicates with the oxygen-containing gas outlet 38b. The second separator 122 is provided with a fuel gas flow passage 126 which communicates with the fuel gas inlet 36a, which is formed in a spiral configuration along the surface of the second separator 122, which is turned at the central portion, and then which communicates with the fuel gas outlet 36b.

In the third embodiment constructed as described above, the portion of the fuel gas flow passage 126, which is disposed in the vicinity of the fuel gas inlet 36a, is arranged closely to the portion of the oxygen-containing gas flow passage 124 which is disposed in the vicinity of the oxygen-containing gas outlet 38b. Therefore, the water, which is produced in the oxygen-containing gas flow passage 124, is permeated from the portion arranged closely to the oxygen-containing gas inlet 38a to the oxygen-containing gas flow passage 124. The same effect as that obtained in the first and second embodiments is obtained. That is, for example, the entire surface of the ion exchange membrane 18 is appropriately humidified, and the non-humidifying operation is performed in a well-suited manner.

In the first to third embodiments, for example, the shape of the serpentine or the spiral configuration is used for the gas flow passage. For example, it is possible to use a gas flow passage of the tournament type in which the number of gas flow passages is successively decreased into the half, i.e., for example, from eight passages to four passages and four passages to two passages, or from six passages to three passages from the gas inlet side to the gas outlet side.

In the fuel cell according to the present invention, the thickness of the solid polymer ion exchange membrane is set to be within the range of 20 μm to 60 μm. The portion of the fuel gas flow passage, which is disposed in the vicinity of the fuel gas inlet, is arranged closely to the portion of the oxygen-containing gas flow passage which is disposed in the vicinity of the oxygen-containing gas outlet, with the solid polymer ion exchange membrane intervening therebetween. It is possible to easily and smoothly supply the water from the oxygen-containing gas flow passage to the fuel gas flow passage. Thus, the non-humidifying operation is performed for the fuel cell.

In the method for operating the fuel cell according to the present invention, at least one of the fuel gas and the oxygen-containing gas is firstly humidified to supply the gas for the predetermined period of time. After that, the fuel gas and the oxygen-containing gas are supplied without humidification to the anode electrode and the cathode electrode respectively. Accordingly, the initial humidification is performed in the short period of time. The non-humidifying operation is started quickly in a well-suited manner. Further, the non-humidifying operation makes it possible to realize the small size and the simplification of the gas-humidifying means itself, which is economic.

What is claimed is:

1. A fuel cell comprising a fuel cell unit composed of a solid polymer ion exchange membrane interposed between an anode electrode and a cathode electrode, and separators for supporting said fuel cell unit interposed therebetween, said fuel cell further comprising:

said solid polymer ion exchange membrane having a thickness set to be within a range of 20 $\mu$m to 60 $\mu$m;

a fuel gas flow passage for supplying, in a non-humidifying manner, a fuel gas from a first side of said solid polymer ion exchange membrane to said anode electrode; and an oxygen-containing gas flow passage for supplying, in a non-humidifying manner, an oxygen-containing gas from a second side of said solid polymer ion exchange membrane to said cathode electrode, wherein:

a portion of said fuel gas flow passage, which is disposed adjacent to an fuel gas inlet, and a portion of said oxygen containing gas flow passage disposed adjacent to an oxygen containing gas outlet are arranged so as to allow diffusion of moisture from the cathode electrode to the anode electrode, with said solid polymer ion exchange membrane intervening therebetween.

2. The fuel cell according to claim 1, wherein each of said fuel gas flow passage and said oxygen-containing gas flow passage is designed to have a meandering configuration in a surface direction of each of said anode electrode and said cathode electrode.

3. The fuel cell according to claim 2, wherein:

said fuel gas flow passage allows said fuel gas to flow in a vertically downward direction while meandering in a horizontal direction; and said oxygen-containing gas flow passage allows said oxygen-containing gas to flow in a vertically upward direction while meandering in said horizontal direction.

4. The fuel cell according to claim 1, wherein:

said fuel gas flow passage and said oxygen-containing gas flow passage include a first fuel gas flow passage and a first oxygen-containing gas flow passage communicating with said fuel gas inlet and an oxygen-containing gas inlet and a fuel gas outlet and said oxygen-containing gas outlet; and said first fuel gas flow passage and said first oxygen-containing gas flow passage have second fuel gas flow passages and second oxygen-containing gas flow passages which are branched into a plurality of passages respectively to equivalently cover said anode electrode and said cathode electrode in a surface direction.

5. The fuel cell according to claim 1, wherein said fuel gas flow passage and said oxygen-containing gas flow passage communicate with said fuel gas inlet and an oxygen-containing gas inlet respectively, are formed in a spiral configuration in a surface direction of each of said anode electrode and said cathode electrode, are returned at central portions thereof, and then communicate with a fuel gas outlet and said oxygen-containing gas outlet respectively.

6. The fuel cell according to claim 1, wherein a pressure of said oxygen-containing gas supplied to said oxygen-containing gas flow passage is set to be higher than a pressure of said fuel gas supplied to said fuel gas flow passage.

7. The fuel cell according to claim 1, further comprising a gas-humidifying means for humidifying at least one of said fuel gas and said oxygen-containing gas for a predetermined period of time before starting operation.

8. The fuel cell according to claim 7, further comprising:

a detector for detecting an amount of water in a discharged gas; and a controller for judging whether or not initial humidification before start of operation is completed on the basis of a detection signal from said detector and controlling said gas-humidifying means.

9. A method for operating a fuel cell comprising a fuel cell unit composed of a solid polymer ion exchange membrane interposed between an anode electrode and a cathode electrode, and separators for supporting said fuel cell unit interposed therebetween, wherein:

a portion of said fuel gas flow passage for supplying a fuel gas to said anode electrode, which is disposed adjacent to an fuel gas inlet, and a portion of said oxygen containing gas flow passage for supplying an oxygen containing gas to said cathode electrode, disposed adjacent to an oxygen-containing gas outlet are arranged so as to allow diffusion of moisture from the cathode electrode to the anode electrode, said method comprising the steps of:

firstly humidifying at least one of said fuel gas and said oxygen-containing gas to supply said gas for a predetermined period of time; and supplying said fuel gas without humidification to said anode electrode and supplying said oxygen-containing gas without humidification to said cathode electrode after passage of said predetermined period of time.

10. The method for operating said fuel cell according to claim 9, wherein said predetermined period of time is set to be a period of time until an amount of water contained in said fuel gas or said oxygen-containing gas discharged from said fuel cell is not less than a predetermined amount.

11. The method for operating said fuel cell according to claim 10, wherein it is judged whether or not initial humidification before start of operation is completed by the aid of a controller on the basis of a detection signal from a detector for detecting said amount of water in said discharged gas.

12. The method for operating said fuel cell according to claim 9, wherein a pressure of said oxygen-containing gas supplied to said oxygen-containing gas flow passage is set to be higher than a pressure of said fuel gas supplied to said fuel gas flow passage.

* * * * *